Oct. 20, 1970  H. T. ROGERS ET AL  3,534,850

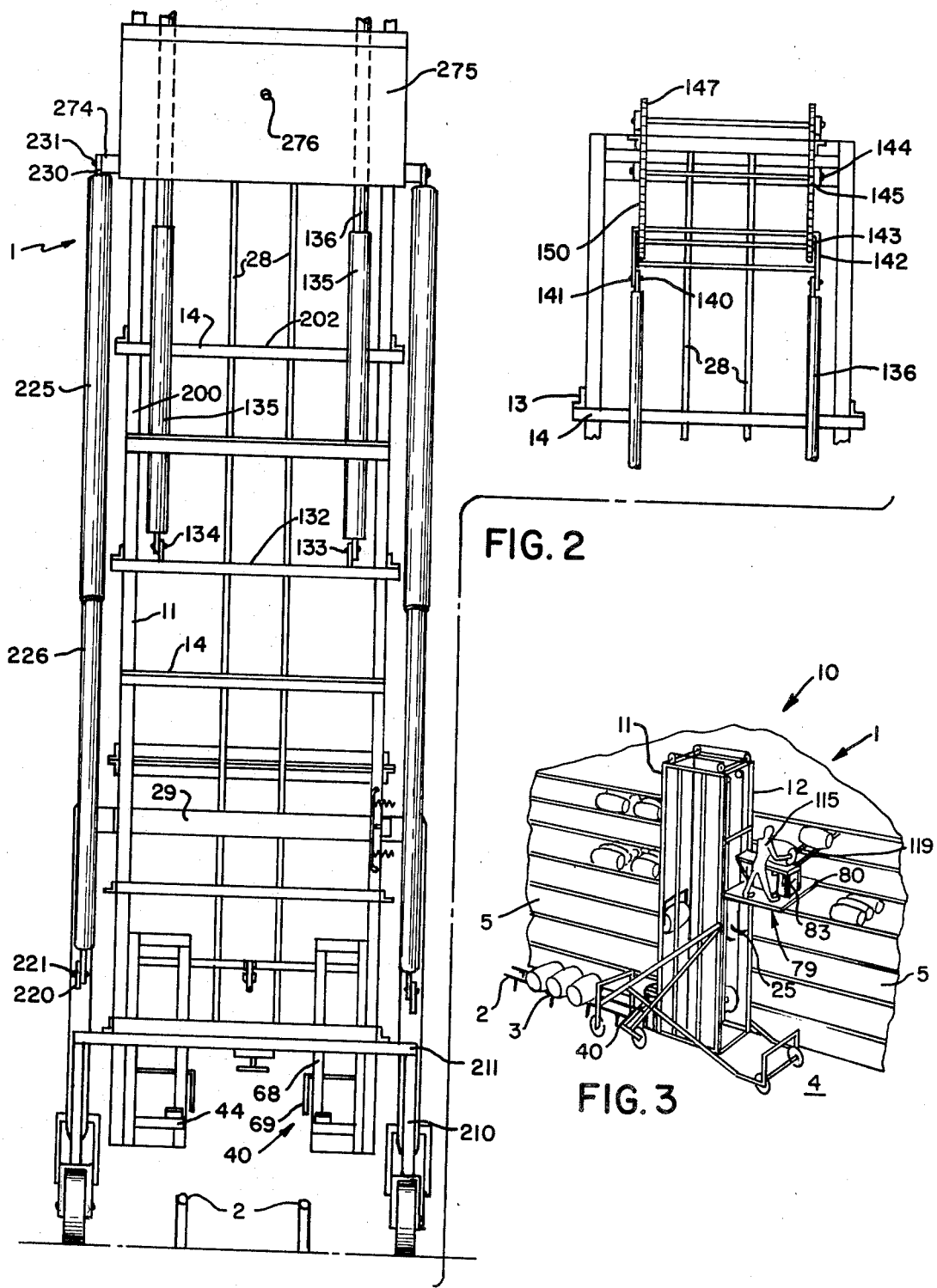

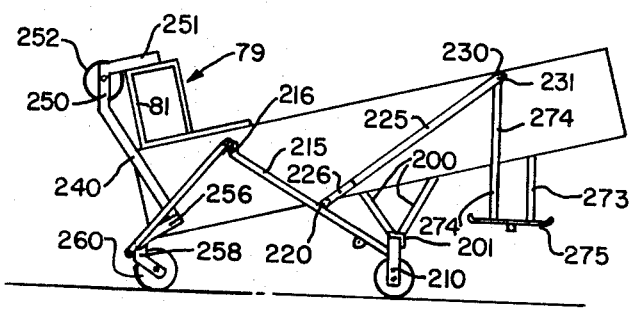
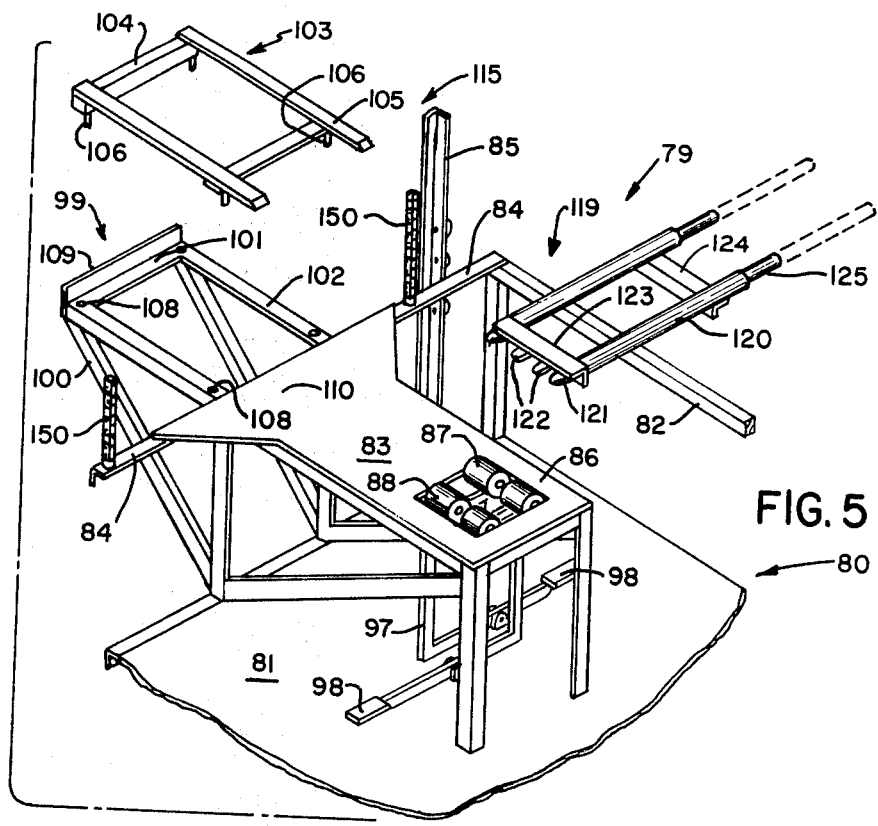

BARREL TRANSFER DEVICE

Filed Aug. 11, 1969  6 Sheets-Sheet 4

INVENTORS
HARRY T. ROGERS
JAMES H. ROGERS
BY
Wm. R. Price
ATTORNEY

Oct. 20, 1970  H. T. ROGERS ET AL  3,534,850
BARREL TRANSFER DEVICE
Filed Aug. 11, 1969  6 Sheets-Sheet 5
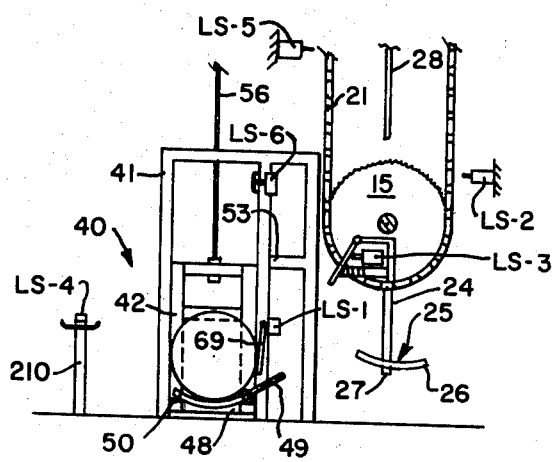
FIG. 9
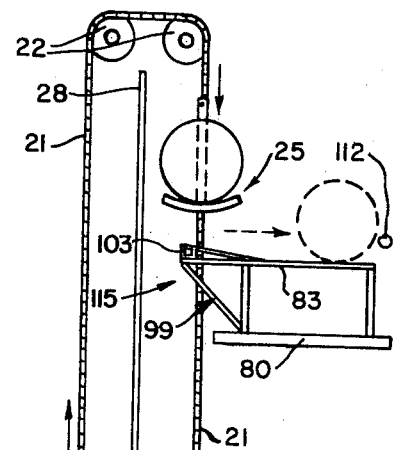
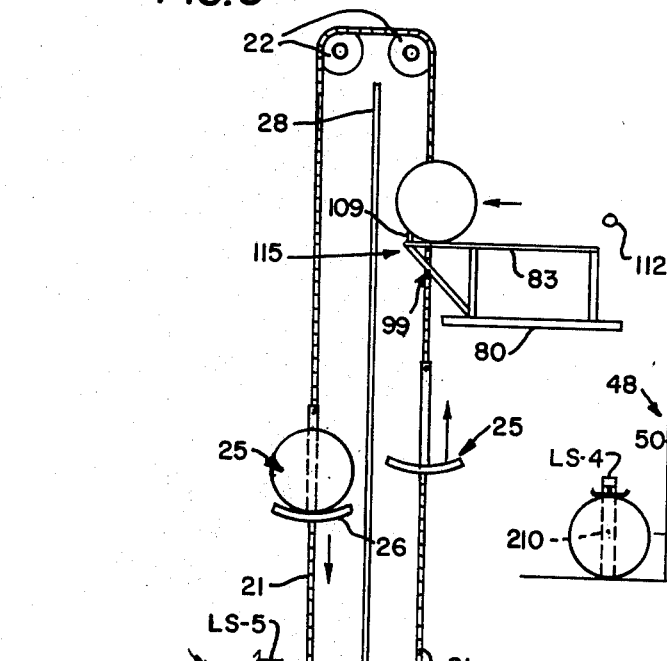
FIG. 10
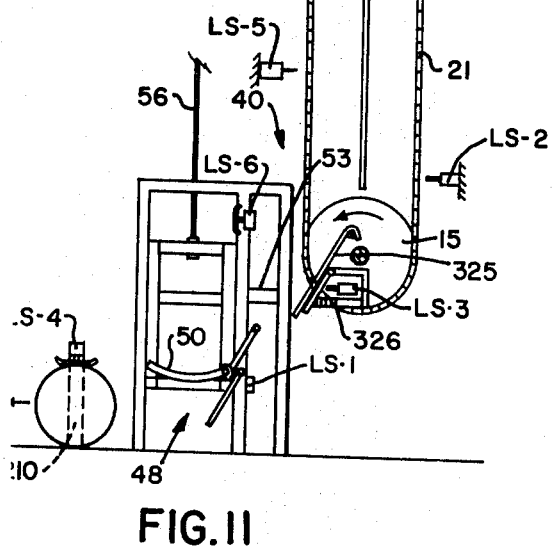
FIG. 11
INVENTORS
HARRY T. ROGERS
JAMES H. ROGERS
BY
*Wm. R. Price*
ATTORNEY

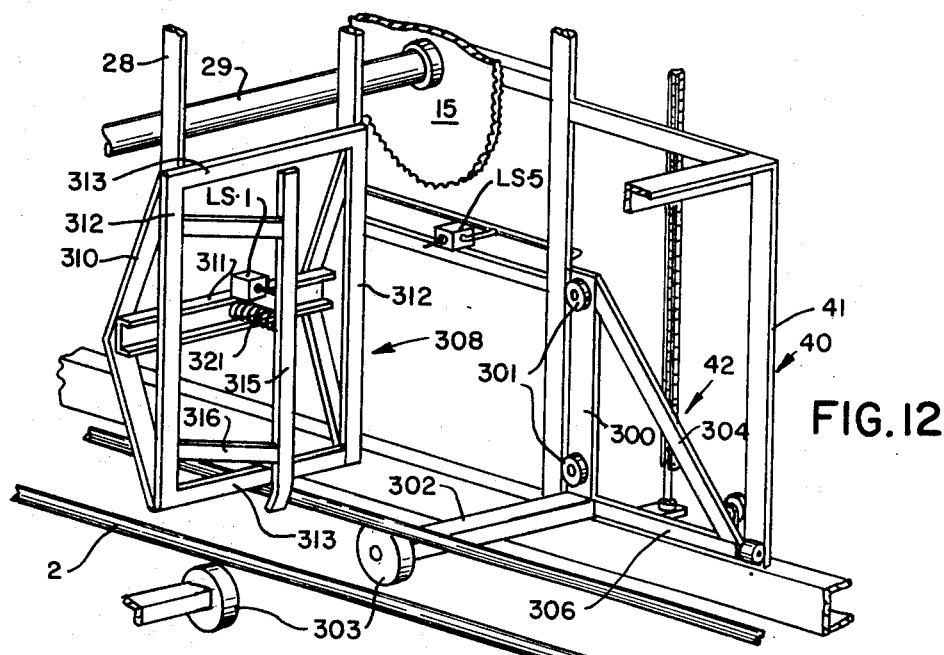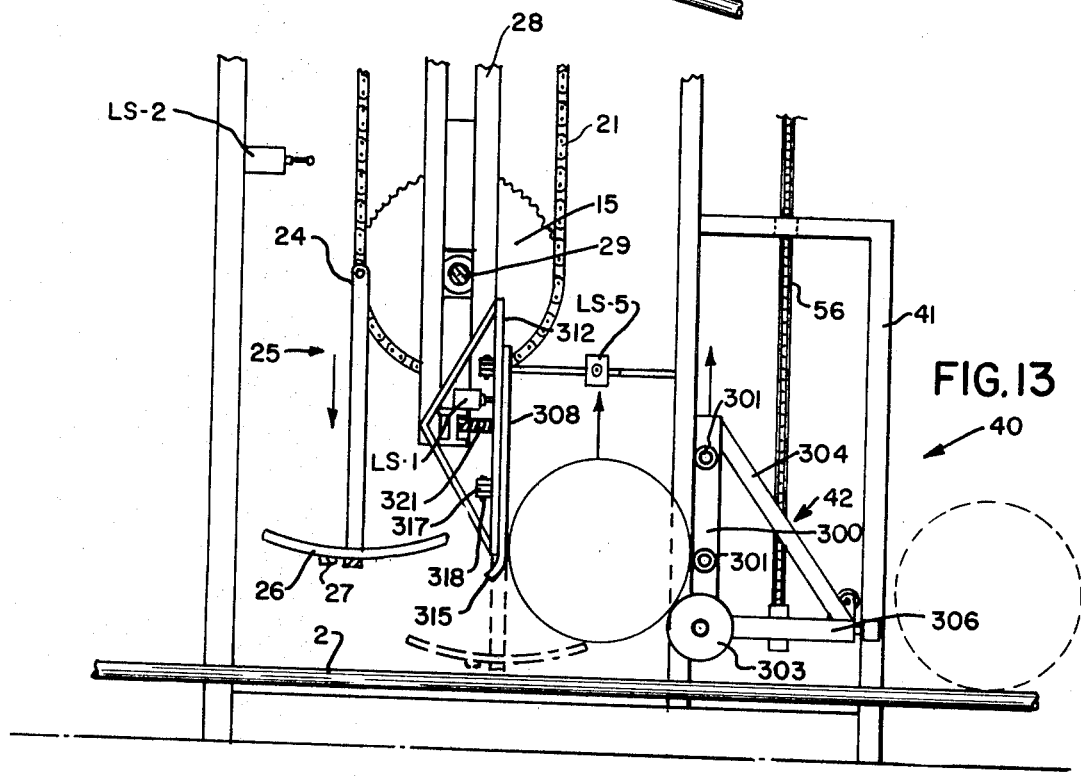

United States Patent Office 3,534,850
Patented Oct. 20, 1970

1

3,534,850
BARREL TRANSFER DEVICE
Harry T. Rogers, New Haven, and James H. Rogers, Louisville, Ky., assignors to Mac Manufacturing Company, Inc., Lebanon Junction, Ky., a corporation of Kentucky
Continuation-in-part of application Ser. No. 766,923, Oct. 11, 1968. This application Aug. 11, 1969, Ser. No. 849,125
Int. Cl. B65g *41/00*
U.S. Cl. 198—233             42 Claims

ABSTRACT OF THE DISCLOSURE

Discloses a barrel transfer device including a lower level loading and unloading station for receiving barrels from or delivering barrels to a track and for loading and unloading same onto cradles, pivotably suspended from a vertically oriented conveyor of an elevator. A variable level loading and unloading station, in the form of a work platform, is mounted for vertical movement on the frame of said elevator and is adapted for loading and unloading barrels at levels corresponding with the levels of vertically disposed racks in a warehouse. The entire device is portable so as to move in a horizontal plane in the middle aisle of a warehouse. In one embodiment, the elevator may be moved from a vertically oriented position to a diagonally oriented position in order to move same from one warehouse to another. A plate containing a kingpin is provided for this purpose to allow the barrel transfer device to be attached to the fifth wheel of a tractor.

CROSS REFERENCE TO RELATED APPLICATION

This application is a continuation-in-part of our copending application entitled "Barrel Elevator" Ser. No. 766,923, filed Oct. 11, 1968.

FIELD OF THE INVENTION

This invention relates to material handling apparatus and particularly to apparatus for elevating and delivering barrels from essentially ground level to variable levels corresponding to levels of vertically spaced racks in a whiskey warehouse. More specifically, this invention relates to a loading and unloading station, located essentially at ground level for receiving and delivering barrels to and from a track and to be loaded onto or unloaded from an elevator for transport to and from vertically spaced racks, located on either side of the aisle of a whiskey warehouse.

More specifically, this invention relates to a lower level loading and unloading station in combination with an elevator and a variable level loading and unloading station, mounted for vertical movement on the frame of the elevator, in which the entire apparatus is portable so that it may be used in the middle aisle of whiskey warehouse to load and unload barrels to and from vertically spaced racks in said warehouse.

DESCRIPTION OF THE PRIOR ART

In whiskey warehousing operations, it has been the practice in the past to utilize a warehouse comprising several individual floors. Each floor contained two or three rows of barrel receiving racks or dunnage. At the end of this type of warehouse, was located an elevator shaft in which a tray or cradle type elevator was situated. This consisted of an endless conveyor trained over upper and lower sprockets, and a series of trays or cradles vertically suspended from said conveyor by hanger members. See for example U.S. 1,829,317 Waechter, assigned to Link-Belt Company, Chicago, Ill. (1931). Thus, barrels were loaded into the warehouse on the ascending side of the elevator and unloaded on the descending side of the elevator. This necessitated a superstructure at each floor level. The superstructure contained a loading and unloading mechanism in order to load barrels from the elevator at each floor level for storage or to unload the barrels from each floor after storage.

Recently, there has been introduced into the art a warehouse structure consisting essentially of an outer shell and a middle aisleway with vertically spaced racks on either side. These racks extended from the middle aisleway laterally to the side walls of the warehouse. The racks contain catwalks between the rows to allow a man to inspect the barrels in the racks and to assist in removing the barrels from the racks after the aging process is complete. Such warehousing eliminates a lot of lost space but presents a problem as to the transfer of barrels to and from the vertically spaced racks.

SUMMARY OF THE INVENTION

According to our invention, barrels may be loaded and unloaded at ground level onto a portable elevator and transported to a variable level loading and unloading station. The variable level loading and unloading station is in the form of a work platform mounted for vertical movement to variable levels corresponding to the levels of the racks located on either side of the middle aisle. Further, according to our invention, the elevator may be moved in a horizontal plane from one end of the aisleway to the other end, until the warehouse and the racks contained therein are completely filled with barrels or are completely unloaded depending upon the operation desired. Further, in one modification, provision is made to move the elevator frame or shaft from its normally vertical position to a diagonally disposed position so as to allow the elevator to be taken through the door of the warehouse for use in another warehouse. For this purpose, there is provided a kingpin engagable with the fifth wheel of a tractor. In another embodiment, a lateral loading and unloading member is provided to transfer barrels between the work platform and the laterally disposed racks.

BRIEF DESCRIPTION OF THE DRAWINGS

FIG. 2 is a front elevation of the barrel transfer device.

FIG. 3 is a diagrammatic pictorial view in perspective, illustrating the barrel transfer device of this invention, in operation, loading barrels into vertically disposed racks in a whiskey warehouse.

FIG. 4 is a partially diagrammatic view of said barrel transfer device in diagonally oriented position for transfer from one warehouse to another.

FIG. 5 is a view in perspective, illustrating the variable level loading and unloading station comprising a work platform, a loading and unloading member and work table.

FIG. 6 is a fragmentary elevational view, with parts in section, illustrating the linkage and pedal for the lever actuated rollers on the work table.

FIG. 9 is a diagrammatic view of the apparatus of our invention illustrating the barrel loading station receiving the barrel.

FIG. 10 is a diagrammatic view of a barrel being loaded from said barrel loading station and onto one of the cradles of said elevator and another barrel being unloaded onto the work table of said work platform.

FIG. 11 is a diagrammatic view of the barrel in position for unloading from said work table and of another barrel on one of said cradles approaching the loading and unloading station.

FIG. 12 is a view in perspective of a modification of a barrel loading and unloading station of this invention.

FIG. 13 is a side elevational view (with parts broken away) of the modification illustrated in FIG. 12.

DESCRIPTION OF THE PREFERRED EMBODIMENT

Figure 1:
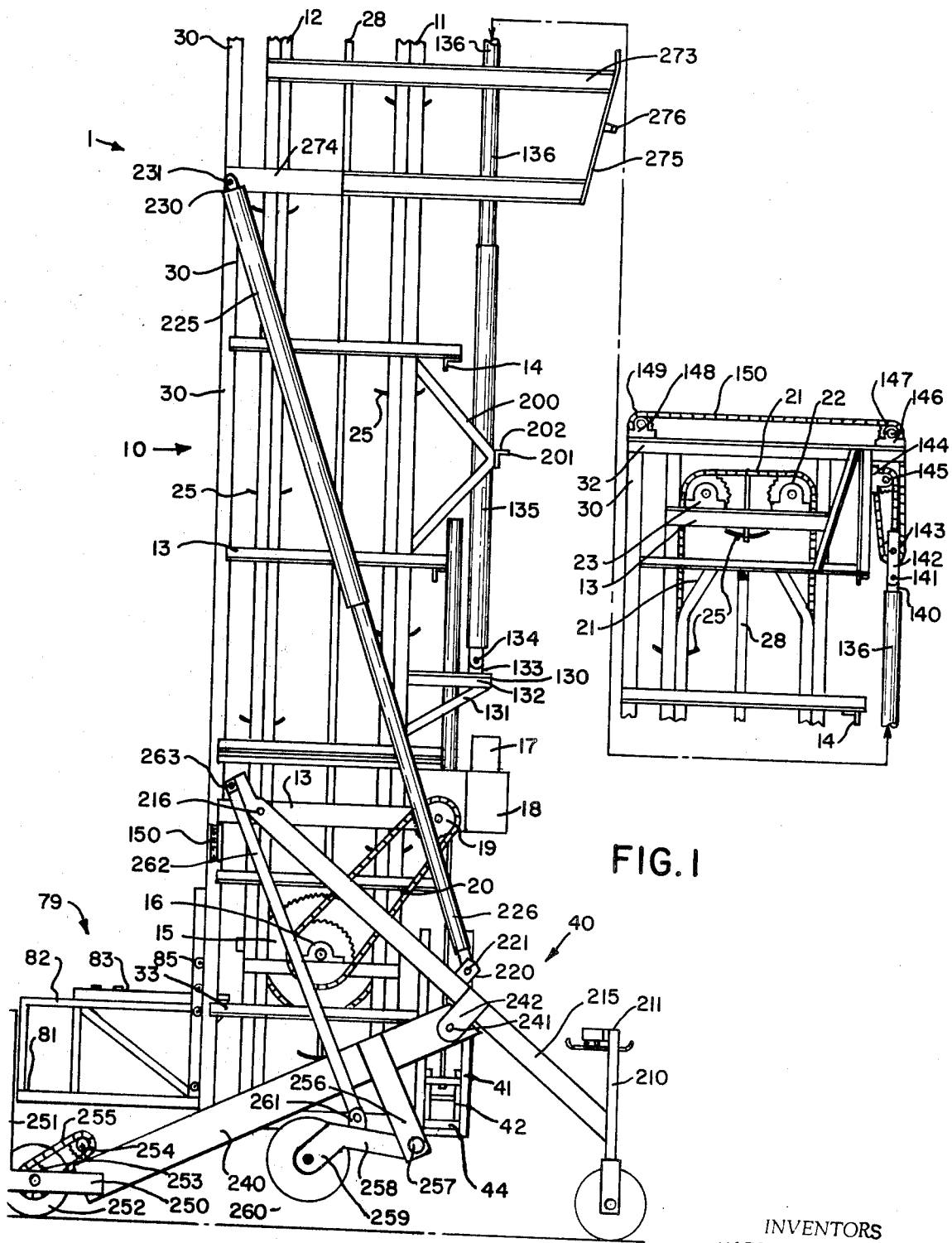
FIG. 1 is a side elevation of the barrel transfer device of this invention.

Referring now to the drawings, the barrel transfer device 1 of the invention is best shown in operation in FIG. 3 wherein barrels are rolled in on tracks 2 supported on skids 3 down the middle aisle 4 of the warehouse. The work platform 80 forming the variable level loading and unloading station 79, is shown receiving barrels which are being loaded into the vertical racks 5 at the side of the aisle 4 of the warehouse. The elevator 10 consists of a frame formed by a front upright member 11, a rear upright member 12 and side transverse members 13 welded thereto. At the front are front transverse members 14 connected across side transverse members 13. Journaled in the pillow blocks 16 on side transverse member 13 is the lower sprocket 15 which is driven by motor 17 through gear reducer 18 to driving sprocket 19 over which is trained the driving chain 20. The upper sprockets 22 are again journaled in pillow blocks 23 contained on side transverse member 13. Conveyor chain 21 of the Link Belt type is trained over the lower and upper sprockets 15 and 22 respectively, and cradles 25 are pivotably suspended from hangers 24. The cradles 25 consist of curved barrel receiving arms 26 connected together by an offset transverse member 27, as is more fully described in our co-pending application Ser. No. 766,923, filed Oct. 11, 1968. Directly behind the lower shaft 29 for sprocket 15 is a vertical guide rod 28 running the entire length of the frame or elevator shaft at sufficient distance from the curved arms 26 of cradles 25 so as to prevent a barrel from tipping out of the cradle and down into the shaft. The rear upright member 30 of the frame forms a bearing surface for the roller assembly 85 of the work platform 80 hereinafter described. Suffice it to say that the upper transverse member 32 and the bottom transverse member 33 tie the frame together at the top and bottom.

Figure 7:
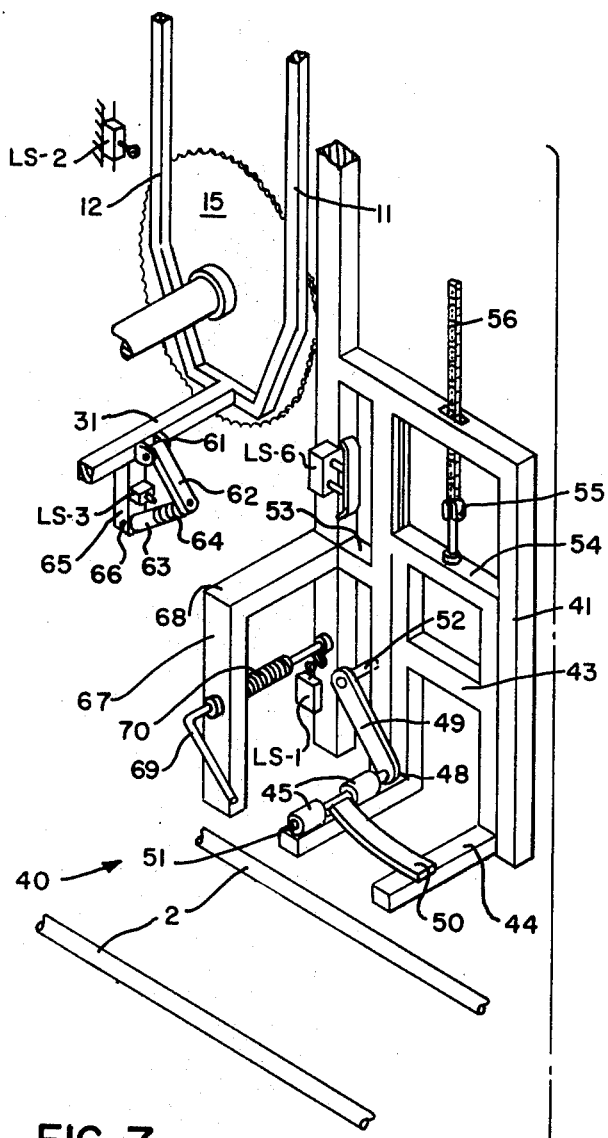
FIG. 7 is a view in perspective of one embodiment of the barrel loading and unloading station of this invention.
Figure 8:
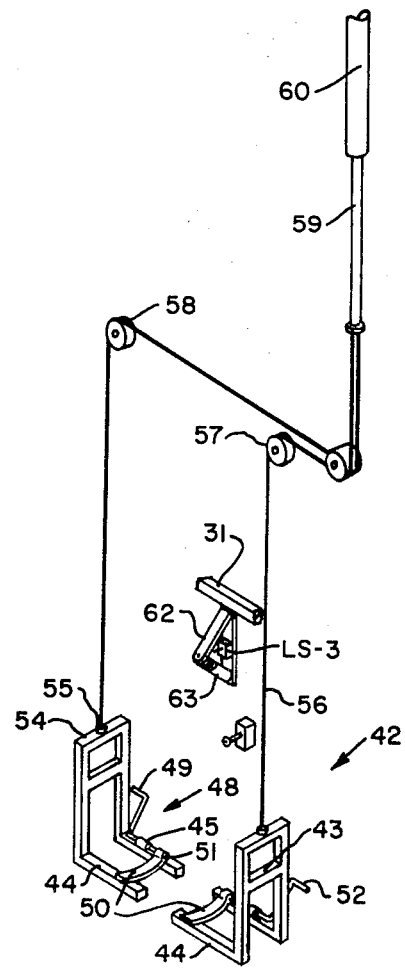
FIG. 8 is a diagrammatic view of the means for moving the barrel lift of this invention from one level to another.

As is best illustrated in FIGS. 7 and 8, at the front of the barrel transfer device is a barrel loading and unloading station 40, located at ground level or at track level if the tracks 2 are supported on skids 3 as illustrated in FIG. 3. This consists of an upright frame 41 in which a barrel lift 42 is slidably positioned. The barrel lift 42 in one embodiment consists of a rectangular side member 43 fabricated of an assembly of welded iron bars and a bottom member 44. The bottom member 44 contains two sleeves 45 for provision of a shaft 51 of a bell crank type lever 48. The lever 48 contains an effort arm 49 and a work arm 50. A pintle 52 projects from effort arm 49. Cross piece 53 engages with the pintle 52 as the barrel lift 42 is raised. This, of course, causes the shaft 51 to pivot in sleeves 45 forcing the work arm 50 through an arc from a horizontal plane to a substantially vertical plane.

As is shown in some detail in FIG. 7, crosspiece 54 between the upright members of side member 43 is connected to eye bolt 55 which in turn is connected to chain 56 which, as is shown in FIG. 8, is trained over pulleys 57 and 58 to connect with the end of piston rod 59 of cylinder 60. Thus, as the piston rod 59 extends, the chain 56, trained over pulleys 57 and 58 allows the barrel lift to be lowered. As the piston rod 59 retracts, the chains pull the barrel lift 42 upwardly so that the pintle 52 of effort arm 49 engages with crosspiece 53 and thus forces the work arm 50 through an arc to push the barrel carried thereon into the receiving arms 26 of a cradle at the loading position.

Since the barrel is quite heavy, it has been found expedient to provide a cushioning device in the form of a shock absorber 63 to prevent the barrel from bouncing out of the receiving arms 26 of the cradle 25. Thus, as is illustrated, a shock absorber 63 containing spring 64 is connected to arm 62. Clevis bracket 61 is connected to the crosspiece 31 which is welded to the front and rear upright members 11 and 12 of the frame. Depending from crosspiece 31 is standard 65 which is pivotably connected by pin 66 to the end of the spring loaded shock absorber 63. A limit switch LS3 is mounted to the standard 65 so that when arm 62 is moved rearwardly the limit switch LS3 is tripped. This actuates a valve (not shown) to supply fluid to cylinder 60 to cause the piston rod 59 to extend and send the barrel lift 42 down.

To the sides of the upright frame 41 and extending toward the middle of the barrel loading station is an upright 67 and a crosspiece 68. Pivoted in the upright 67 is an L-shaped member 69 biased by spring 70 so as to normally project forwardly. Thus, upon contact of the barrel with the protruding leg of the L-shaped member 69, the leg is pushed back against the biasing pressure of spring 70 so as to operate limit switch LS1 which senses that the barrel is now in the barrel lift 42. As will be hereinafter described, limit switch LS1 is electrically interconnected with limit switch LS2 which senses that a cradle is approaching the loading and unloading station 40 and thus, activates a valve (not shown) to supply fluid to cylinder 60 to retract piston rod 59 and pull the barrel lift 42 upwardly to loading position. As indicated previously when the pintle 52 strikes crosspiece 53 of the frame 41 work arm 50 is swung through an arc so as to push the barrel onto the receiving arms 26 of the cradle now in loading position.

Referring now to FIGS. 1 and 5, mounted for movement, in upright 30 of the frame of the elevator shaft is the variable level loading and unloading station 79, consisting of platform 80. Platform 80 has a floor 81 and railing 82 so as to provide space for a workman and protection against falling over the edge of the work platform.

Supported on legs in the middle of the platform 80, is a work table 83 which is located at about waist height for the average workman. A crosspiece 84 at the front edge of the work platform is operatively connected with a roller assembly 85 so as to provide an essentially frictionless movement along the bearing surface offered by the interior surface of vertical upright 30. An opening 86 in the center of the work table 83 provides a space for two pairs of rollers 87 and 88, which are journaled on their respective stub shafts. As is best shown in FIG. 6, L-shaped members 90 provide stub shafts for roller 87 and 88, and are pivotably connected to standards 89 by pins 91. A spring 113 is connected to L-shaped member 90 and the under surface of table 83 so as to raise rollers 87 and 88 above the surface of table 83. Rollers 87 or 88 may be lowered by depressing the foot pedal 98 located on the opposite side of the table. Thus, as is shown in FIG. 6, when roller 87 is lowered, the barrel may be rolled off the table in the direction shown. This is accomplished by a toggle joint 93 formed by links 92 which are pivoted at the top to L-shaped member 90 and at the bottom to standard 95 by pins 94. Standard 95 is, as shown, supported on crosspiece 114. Bracket 96 attached to the floor 81 of work platform 80 acts as a fulcrum for U-shaped lever 97.

A loading and unloading member 115, which extends forwardly from the work table 83 and the crosspiece 84 into the elevator shaft, consists of support bracket 99. This bracket consists of diagonally disposed struts 100 extending from the floor 81 of the work platform 80 diagonally to a crosspiece 101 which in turn is attached to two elongated members 102 which extend in a horizontal plane back to frustotriangular surface 110 of the work table 83. A removable member 103 of the loading and unloading member 115, consists of a transverse member 104 in the form of a channel iron which is connected to two longitudinal members 105. The longitudinal members 105 contain pintles 106 adapted to fit into holes 108 in the elongated members 102 of the support bracket 99.

The transverse member 104 is of sufficient thickness to incline the elongated members 105 toward the work table 83 and so as to allow barrels to gravitationally roll to the work table. The barrels then come into contact with pairs of rollers 87 and 88. It will be noted that the support bracket 99 is in a horizonal plane relative to the surface of the work table and that crosspiece 101 contains a stop 109 so that barrels may be loaded from the work table onto the support bracket to be picked up by ascending cradle 25 as illustrated in FIG. 11. When unloading barrels from the elevator, the removable piece 103 is placed onto the support bracket 99 with the pintles 106 in registry with holes 108 so that barrels will gravationally roll from the descending elevator as diagrammatically illustrated in FIG. 10. In either event, the workmen can utilize the rollers 87 and 88 to advantage in turning the barrels 90° and pushing them onto the loading and unloading member 115 for the unload cycle or for pushing them onto the lateral loading and unloading member 119 into the vertically spaced racks 5 during the load cycle.

The lateral loading and unloading member 119 consists of a pair of rail members 120 which contain lugs 121 to fit over the work table side 83 and a pair of lugs 122 which fit under the surface of the side of work table 83. A crosspiece 123 in the form of an angle iron forms the mounting for lugs 121 and 122 whereas a crosspiece 124 is adapted to fit over the railing 82 of the work platform 80. Each of the rail members 120 are fabricated of metal pipe containing tubular extensions 125 telescopically mounted therein so as to compensate for any variation in distance between the work platform 80 and the vertically spaced racks 5 in a particular warehouse. At the rear of the work platform 82 the height of the railing is increased at a point 112, relative to the rest of the railing so as to be higher than the level of the work table 86. This is a safety feature to prevent barrels from rolling off of the work table 83 over the rear end of the platform and down into the warehouse causing injury to one of the workmen.

The vertical movement of the variable loading and unloading station 79 is powered by the large cylinder 135 and extensible piston rod 136. Thus, when the piston rod 136 retracts, the work platform 80 is drawn upwardly by chain 150 whereas if the piston rod 136 is extended, the work platform is lowered.

Referring now to FIG. 1, the cylinder 135 is supported on bracket 130 consisting of strut 131 and horizontal member 132. Clevis bracket 133 is used to secure the cylinder 135 by means of clevis pin 134 to bracket 130. The piston rod 136 extends upwardly and is connected via clevis bracket 140 and clevis pin 141 to block 142 of sprocket 143. Associated with block 142 and sprocket 143 is block 144 containing sprocket 145 and block 146 containing sprocket 147. The chain 150 is connected to the block 142 and is then trained over sprockets 143, 145, 147 and the sprocket 149 contained in block 148 to go along the interior surface of the upright member 30 of the frame to be connected to crosspiece 84 and the roller assembly 85. The roller assembly 85 then, rides along the bearing surface provided by the interior surface of upright member 30 so that as the piston rod 136 is retracted, the work platform 80 is raised to an appropriate level to load barrels onto a particular vertically spaced race.

As previously indicated, in one embodiment, the apparatus of this invention is designed to be moved into a diagonally oriented position so as to be movable from one warehouse to another. To accomplish this, on the front upright members 11 of the frame, is associated a bracket consisting of diagonally disposed struts 200 and a horizontally disposed angle iron 201 containing a hole 202 for provision of a lock pin.

Forward of the loading and unloading station 40 is disposed an upright post 210 and top transverse member 211 which as is shown in FIG. 4 provides an area for support of the elevator frame through the means of bracket 200 and 201 against the top transverse member 211 of the upright post 210. A lock pin (not shown) is adapted to fit through hole 201 and a hole in the transverse member 211 to lock same into position so that the apparatus can be moved. In order to allow for the movement of the elevator shaft from a generally vertical position to the diagonally disposed position illustrated in FIG. 4, there is provided a pair of first diagonally oriented members 215, connected by pin 216 to crosspiece 13 and rear upright member 12 of the frame. A clevis bracket 220 pivotably connects member 215 by means of pin 221 to the piston rod 226 of cylinder 225 which (cylinder 225) is connected via bracket 230 and pin 231 to the upright frame 30 and crosspiece 274.

The second diagonally disposed pair of members 240 is connected by lockpin 241 to bracket 242 on the bottom surface of the first diagonally disposed member 215. The bottom part of the second diagonally disposed member 240 is connected to frame member 250 and 251 of the work platform 80. Journaled in the horizontal portion 250 of this frame member is a rear wheel 252 containing a sprocket 253 driven by drive sprocket 254 and chain 255 trained over both the sprockets 253 and 254.

In order to move the elevator frame from the position shown in FIG. 1 to the position shown in FIG. 4, lockpin 241 is removed so as to disengage the second pair of diagonally disposed members 240 from the first pair of diagonally disposed members 215. Thereafter, the piston rod 226 is retracted, thus pulling the frame through an arc to the position shown in FIG. 4 with the transverse member 201 of bracket 200 resting on the transverse member 211 of upright post 210 and locked into position by means of a lockpin (not shown) through hole 202 of transverse member of 201. It will be noted that in the diagonally oriented position, as shown in FIG. 4, the work paltform 80 is raised out of contact with the floor so that wheel 252 is suspended in space.

In order to provide a set of wheels to allow the apparatus to be moved, a split leg 256 is made dependent from second diagonally disposed member 240 and is connected by pin 257 to a leg 258. Leg 258 terminates in a clevis member 259 in which wheel 260 is journaled. However, connected to the lower portion of leg 258 is a bracket 261 to which a rod 262 is fitted. The upper end of rod 262 is fitted into bracket 263 on the bottom end of the first diagonally disposed member 215. Therefore, as the piston rod 226 retracts into cylinder 225, pulling the frame forwardly to the position shown in FIG. 4, the diagonally disposed rod 262 acts on the pivotable leg 258 to push the wheel 260, journaled in clevis member 259 downwardly to the position shown in FIG. 4. As the piston rod is extended after removal of the lock pin from hole 202, the relative position of the end of the first diagonally disposed member causes the diagonally disposed rod 262 to pull pivotably depending leg 258 back into the position shown in FIG. 1 as the frame is again reoriented vertically and as the end of the second diagonally disposed member 240 comes into registry with the bracket 242 so that lockpin 241 can be inserted therein to lock the frame back into position.

Referring now to FIG. 1, a brace 273, extending across frame upright members 12 and 11 and brace 274 connected to upright frame members 30, 12 and 11 are both connected to plate 275 which supports kingpin 276. As is illustrated in FIG. 4, when the frame is in diagonally disposed position, kingpin 276 may register with a conventional fifth wheel of a tractor so that the entire apparatus may be pulled from one warehouse to another.

Referring now to FIG. 12, a modification of the barrel loading and unloading station 40 is illustrated in which the barrel lift 42, slidably positioned in frame 41, consists of an upright 300 containing rollers 301 designed to roll on the bearing surface afforded by frame 41. A bottom member 302 projects inwardly toward the tracks 2 and contains a large wheel 303 as its end. The upper edge of said wheel is at about the same level as the upper edge of the track. Extending diagonally from the top of the vertical member 300 is a strut 304 which extends down to an angle iron 306, which connects the upright 300, and the strut 304. There is coaction on the barrel lift 42 with the rectangular structure 308. Rectangular structure 308 is connected to the lower ends of vertical guide rods 28. This consists of a bracket 310, containing a crosspiece 311. Vertical upright members 312 are connected to bracket 310. A crosspiece 313 connects the two vertical members which acts as a stop for the barrel arriving on track 2. A contact bar 315 projects forwardly of the rectangular structure 308 and is supported by members 316 which are pivotably connected in brackets 317 by pins 318 and which is biased forwardly by means of spring 321. As the connecting bar 315 is pushed backward by the barrel, limit switch LS1 is contacted. By use of the rectangular structure 308 in conjunction with the modified barrel lift 42 which is lifted by means of the piston rod 59 connected to chain 56 of cylinder 60, the large wheel 303 at the end of the bottom member 302 tends to roll against the bottom of the barrel as it is puhed against the vertical uprights 312 and the contact bar 315 as the barrel lift 42 rises. A cradle 25, connected to the conveyor chain 21 trained over the lower sprocket 15 thus rises beneath the barrel suspended between the barrel lift 42 and the rectangular structure 308 while the lower wheel 303 tends to roll the barrel onto the receiving arms 26 of the cradle 25.

In the unloading cycle, the barrel lift 42 at the top of frame 41 is in position to receive the barrel between the vertical upright 312 and contact bar 315 being delivered by the descending cradle, thus the wheel 303 tends to hold the barrel in contact with the rectangular member 308 until the barrel lift reaches the bottom of the stroke in which the roller 303 then is at the same level as the track 2.

LOADING OPERATION

Referring now to FIGS. 9 and 10, the loading operation is illustrated with the barrel entering the loading and unloading station 40 as shown in FIG. 9. The barrel, upon entering the loading station 40, rolls onto the barrel lift 42 so that the barrel rests on the work arm 50 of lever 48 with the effort arm 49 disposed diagonally upward. The weight of the barrel energizes limit switch LS1 which then through electrical interconnection with LS2 (upon contact with a cradle on the descending side of the conveyor 21) actuates a valve (not shown) to supply fluid to cylinder 60 to retract cylinder 59 and thus raise the barrel lift 42 upwards. As the barrel lift rises, the pintle projecting from effort arm 49, engages with crosspiece 53 and effort arm 49 is pushed downwardly so that work arm 50 travels through an arc into an almost vertical position pushing the barrel onto the cradle 25 now in position at the loading level. As is best shown in FIG. 8, the weight of the barrel presses against the arm 62 of the energy absorbing member 63 so as to trip LS3 which actuates valve (not shown) to supply fluid to cylinder 60, to lower barrel lift 42 by extension of the piston rod 59 of cylinder 60.

In the embodiment shown in FIGS. 12 and 13, the conveyor chain 21 is not driven continuously as is the case with the embodiments illustrated in FIGS. 7–11. In the embodiment shown in FIGS. 12 and 13, the motor 17 which drives the large sprocket 15 is started by a motor starter (not shown) which is controlled by limit switch LS1. Thus in the load cycle, the conveyor 21 is started when LS1 is actuated. Secondly, through electrical interconnection with LS2, a valve (not shown) supplies fluid to cylinder 60 to retract piston rod 59 and thus pull the barrel lift upwardly when LS2 is tripped by a cradle approaching the loading station. Further, as will be noted, LS1 is activated so long as a barrel is in contact with contact bar 315. When the barrel is in raised position LS5 is tripped to lower the barrel lift after the barrel has been engaged by the cradle and LS1 has been deactivated. This stops conveyor 21 until a new barrel contacts bar 315 so as to activate LS1.

In the unload cycle, as illustrated in FIG. 11, the cradle 25 on the ascending side of the conveyor 21 travels so that the receiving arms 26 come into contact with a barrel held in position by stop 109 on support bracket 99 of the loading and unloading member. The vertical guidebars 28 prevent the barrel from tipping out of the receiving arms 26 of the cradle and falling down into the shaft to destroy the barrel, the mechanism or to cause injury to one of the workmen. As is shown, the barrel on the descending side of the elevator is approaching the loading and unloading station 40 where the barrel comes into contact with the inclined member 325 which is in contact with rod 326 which trips LS3 due to the weight of the barrel traveling over the pivotably suspended inclined unloading member 325. As previously indicated, LS3 activates a valve (not shown) to supply fluid to cylinder 60 and extend piston rod 59 to lower the barrel lift 42 so that the work arm 50 in essentially vertical position begins to travel through an arc back to a horizontal plane as the barrel is loaded thereon. The barrel lift 42, being in fully raised position, has made contact with limit switch LS6, which through an electrical interconnection with LS5 will stop the cradle 25 approaching the loading station if the barrel lift 42 is not in unloading position. The barrel, rolling off of the track 2 passes through the center upright post 210 and comes into contact with one way limit switch LS4 which signals the valves of cylinder 60 to retract piston rod 59 to raise the barrel lift into the top position awaiting the arrival of the next barrel.

We claim:
1. A barrel transfer device for loading barrels onto vertically spaced racks in a warehouse and for unloading barrels from vertically spaced racks in a warehouse, which comprises:
 (A) a vertically oriented endless conveyor including upper and lower sprocket assemblies and a series of barrel bearing cradles pivotably suspended from said conveyor;
 (B) a barrel loading and unloading station for loading barrels onto said cradles and for unloading barrels from said cradles;
 (C) a movable frame for said conveyor and serving as a support for said upper and lower sprocket assemblies;
 (D) a variable level loading and unloading station mounted for vertical movement on said frame, comprising:
  (1) a work platform providing working space for a workman, and
  (2) a loading and unloading member, extending from said platform into the path of said cradles to allow for engagement with barrels on said cradles to transfer same to said platform and to transfer barrels from said platform to said cradles,
  (3) a lateral loading and unloading member for transferring barrels from said platform to vertically spaced racks at the sides of said platform and for transferring barrels from said racks to said platform; and
 (E) means for moving said variable level loading and unloading station vertically to vertical levels corresponding to the levels of said racks.

2. A barrel transfer device, as defined in claim 1, in which said barrel loading and unloading station comprises:
(A) a barrel lift located at a lower receiving and delivery level and mounted for vertical movement between said lower level and an upper transfer level in proximity to a point in the path of the cradle on said endless conveyor;
(B) a transfer means for transferring a barrel between said barrel lift and said cradle at said transfer level, and
(C) means for moving said barrel lift from one level to another.

3. A barrel transfer device, as defined in claim 2, in which barrel lift comprises two projecting members, spaced apart in opposed relation to support the underside of a barrel on its side, at each end of said barrel.

4. A barrel transfer device, as defined in claim 2, the further combination therewith of a frame forming a support and guide structure for said barrel lift.

5. A barrel transfer device, as defined in claim 3, in which each of said projecting members contain a wheel rotatively journaled therein, said wheel being mounted so as to coact with the surface of the barrel during the vertical movement of said barrel lift.

6. A barrel transfer device, as defined in claim 5, the further combination therewith of:
(A) a vertical upright located behind said path of said cradles and extended from said lower level to said transfer level and being mounted onto the frame of said conveyor so as to coact with a barrel on said barrel lift.

7. A barrel transfer device, as defined in claim 6, in which said vertical upright forms part of a rectangular member against which a barrel is urged by the wheels of said barrel lift during the loading and unloading operation.

8. A barrel transfer device, as defined in claim 2, the combination therewith of a first sensing means located in proximity to said barrel lift at its receiving level for sensing a barrel in said lift.

9. A barrel transfer device, as defined in claim 2, the combination therewith of a second sensing means located in proximity to the path of travel of said cradle, for sensing the presence of a cradle, approaching said upper transfer level,
(A) said second sensing means serving to block the activation of said means for moving said barrel lift from one level to another, if a cradle were not sensed by such second sensing means.

10. A barrel transfer device, as defined in claim 2, a third sensing device located at said transfer level to sense the transfer of a barrel between said barrel lift and said cradle and to actuate means for moving said barrel lift from said transfer level to said lower level.

11. A barrel transfer device, as defined in claim 2, the further combination therewith of a fourth sensing means at the lower delivery level which senses that a barrel has been delivered from said barrel lift and which actuates said means for lifting the barrel lift.

12. A barrel transfer device, as defined in claim 2, a further combination therewith of a sixth sensing device located at said transfer level, which senses when said barrel lift is at transfer level.

13. A barrel transfer device, as defined in claim 2, the further combination therewith of a fifth sensing means located at said transfer level, which actuates the drive for the endless conveyor to stop the cradle, if said barrel lift is not at transfer level.

14. A barrel transfer device, as defined in claim 1,
(A) the combination with said frame of lower wheels and axle assemblies journaled in the lower portion of said frame to allow for horizontal movement of said device.

15. A barrel transfer device, as defined in claim 14, the further combination therewith of a motor operatively connected to one of said wheel and axle assemblies, so as to provide self-powered locomotion for said device in a horizontal plane.

16. A barrel transfer device, as defined in claim 1, in which said frame comprises four upright members and transverse members connected to said upright members for rigidity and support,
(A) means for moving said frame and endless conveyor from a vertically oriented position to a diagonally oriented position for purposes of moving said device from one warehouse to another, which comprises:
(1) a pair of upright posts and a top transverse member for supporting said frame in said diagonally oriented position for movement in a horizontal plane;
(2) a first pair of diagonally oriented members pivotably connected to a pair of adjacent upright members of said frame and fixedly connected to said pair of upright posts;
(3) means for moving said frame through an arc from said vertically oriented position to said diagonally oriented position;
(4) a pair of pins for pivotably connecting said frame to said pair of diagonally oriented members.

17. A barrel transfer device, as defined in claim 16, in which said means for moving said frame through an arc between said vertically oriented position and said diagonally oriented position is a cylinder and piston rod assembly
(A) said cylinder and piston rod assembly being anchored at one end to said frame and said cylinder and piston rod assembly being anchored at the other end to said diagonally oriented members, so that when said piston rod is in fully extended position, said frame is vertically oriented and when said piston rod is in fully retracted position said frame is diagonally oriented.

18. A barrel transfer device, as defined in claim 16, the further combination of:
(A) a second diagonally disposed member connected at one end of the frame of said work platform and at the other end to one of said pair of first diagonally disposed members, and
(B) a removable lock pin locking said first and second diagonally disposed members together.

19. A barrel transfer device, as defined in claim 16, the further combination therewith of a retractable wheel and axle assembly which is in retracted position when the device is vertically oriented and which is in extended position when the device is diagonally oriented.

20. A barrel transfer device, as defined in claim 19, in which said retractable wheel and axle assembly includes:
(A) a leg and clevis member in which said axle assembly is journaled and
(B) a split leg depending from said second diagonally disposed member;
(C) a pin pivotably connecting said split leg to said leg and clevis member.

21. A barrel transfer device, as defined in claim 20, the further combination with said retractable wheel and axle assembly of
(A) a diagonally disposed bar pivotably connected at one end to said first diagonally disposed member and fixedly attached to the other end of said leg and clevis member.

22. A barrel transfer device, as defined in claim 16, the further combination therewith of
(A) a reinforcing brace member projecting from each side of said frame;
(B) a cross piece connected to each of said reinforcing brace members,
(1) said crosspiece being so placed as to register with said transverse member once said frame is in diagonally oriented position.

23. A barrel transfer device, as defined in claim 22, the further combination therewith of a locking pin to engage said crosspiece and said transverse member once said frame is in diagonally oriented position.

24. A barrel transfer device, as defined in claim 16, the further combination therewith of a locking pin which engages said diagonally oriented member in said frame when the frame is in vertically oriented position.

25. A barrel transfer device, as defined in claim 16, the further combination therewith of
    (A) a pair of forward projecting reinforcing brace members,
    (B) a crossplate connected to each of said brace members, and
    (C) a king pin on said crossplate designed for engagement with the fifth wheel of the tractor.

26. A barrel transfer device, as defined in claim 1, in which said barrel bearing cradles comprise two curved load receiving arms for receiving and supporting a barrel on its side and a transverse connecting bar connected to said load receiving arms,
    (A) said transverse connecting bar being offset at its point of connection past the perpendicular through the center of gravity of said barrel on said barrel bearing cradle.

27. A barrel transfer device, as defined in claim 26, in which said unloading member extends from said work platform into the path of said load or barrel bearing cradles but out of contact with said receiving arms past the perpendicular through said center of gravity, and short of rubbing contact with said transverse connecting bar.

28. A barrel transfer device, as defined in claim 1, in which said loading and unloading member includes a support bracket, which comprises:
    (A) diagonally disposed struts extending from said work platform into the path of said cradles;
    (B) a crosspiece, mounted transversely and connected to the upper end of said diagonally disposed struts;
    (C) a pair of elongated members, fixedly connected to said crosspiece and extending back to said platform in a horizontal plane.

29. A barrel transfer device, as defined in claim 28, the further combination with said support bracket of:
    (A) a removable member, detachably connected to said support bracket and capable of being inclined in one position toward said platform to gravitationally roll barrels from said cradle to said platform.

30. A barrel transfer device, as defined in claim 29, in which:
    (A) said removable member comprises a transverse member and two longitudinal members, said transverse member being fastened to the underside of said longitudinal members near the end and being of sufficient thickness to raise the same and incline the member toward said platform.

31. A barrel transfer device, as defined in claim 30, in which:
    (A) said longitudinal members include a pintle extending from the underside thereof;
    (B) the combination therewith of a hole in the upper surface of said support bracket for engaging with the pintle of said removable member.

32. A barrel transfer device, as defined in claim 28, the further combination with said support bracket of
    (A) a stop near the end of said bracket to prevent barrels rolling off the end of said bracket.

33. A barrel transfer device, as defined in claim 1, in which said work platform includes:
    (A) a work table on said platform, said work table being in operative relation with said elongated members of said work bracket so as to provide a rolling surface for said barrels to and from the path of said cradles in said elevator shaft and to and from said work tables.

34. A barrel transfer device, as defined in claim 33, in which said work table contains rollers for receiving a barrel and to facilitate turning it 90° for transfer from said table.

35. A barrel transfer device, as defined in claim 33, the further combination with said work table of:
    (A) a pair of rail members and attachment means for attaching to the side of said work table, said rails extending laterally to said vertically spaced racks so as to provide a rolling surface to and from said racks and to and from said work table.

36. A barrel transfer device, as defined in claim 33, in which said rail members are tubular and contain telescopically mounted tubular members which extend and retract so as to compensate for differences between said work table and said racks.

37. A barrel transfer device, as defined in claim 33, in which said attachment means consist of a pair of lugs on said rail members which fit over and below the edge of said table.

38. A barrel transfer device, as defined in claim 34, in which said work platform contains a railing around its periphery.

39. A barrel transfer device, as defined in claim 38, in which said railing is at least equal in height to the surface of said work table.

40. A barrel transfer device, as defined in claim 38, in which said railing at the rear of said work table is higher than the surface of said work table to act as a stop so as to prevent barrels rolling off of the work platform.

41. A barrel transfer device, as defined in claim 35,
    (A) the combination therewith of a railing around the periphery of the work platform equal in height to the surface of said work table, said railing acting as a support for said pair of rail members.

42. A barrel transfer device, as defined in claim 34, the combination therewith of:
    (A) a bracket and shaft assembly for said rollers;
    (B) a linkage attached at one end to said assembly;
    (C) a lever attached to the other end of said linkage.
    (D) means for providing said lever and the linkage to cause vertical movement at said rollers so as to urge a barrel toward one side of said work table.

References Cited
UNITED STATES PATENTS

| | | | |
|---|---|---|---|
| 665,022 | 1/1901 | Levalley | 198—156 |
| 746,247 | 12/1903 | Baggaley | 214—16.4 |
| 2,726,753 | 12/1955 | Bee. | |
| 3,343,692 | 9/1967 | Arnot. | |

ANDRES H. NIELSEN, Primary Examiner

U.S. Cl. X.R.
198—20; 214—16.4